United States Patent [19]

Shibahara

[11] Patent Number: 5,002,829
[45] Date of Patent: Mar. 26, 1991

[54] RUBBER COMPOSITION, RUBBER FORMED ARTICLE AND RUBBER VIBRATION ISOLATOR

[75] Inventor: Akihiro Shibahara, Komaki, Japan

[73] Assignee: Tokai Rubber Industries, Ltd., Japan

[21] Appl. No.: 559,421

[22] Filed: Jul. 26, 1990

Related U.S. Application Data

[63] Continuation of Ser. No. 412,336, Sep. 26, 1989, abandoned.

[51] Int. Cl.$^5$ .................. B32B 00/00; C08C 19/22
[52] U.S. Cl. .................. 428/409; 428/411.1; 525/346; 525/377
[58] Field of Search ............ 525/346, 386, 387, 377; 524/571, 573, 574, 575; 428/409, 411.1

[56] References Cited

U.S. PATENT DOCUMENTS 3,756,969 9/1973 Danielson .................. 525/375

Primary Examiner—Christopher Henderson
Attorney, Agent, or Firm—Oliff & Berridge

[57] ABSTRACT

A rubber composition containing (a) a rubber material, (b) carbon black, (c) a vulcanizing agent, and (d) an amine compound represented by the following structural formula:

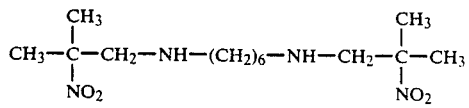

the rubber composition containing 0.5 to 4 parts by weight of the amine compound per 100 parts by weight of the rubber material. The rubber composition is vulcanized to produce a rubber formed article such as a rubber vibration isolator.

23 Claims, No Drawings

RUBBER COMPOSITION, RUBBER FORMED ARTICLE AND RUBBER VIBRATION ISOLATOR

This is a division of application Ser. No. 07/412,336 filed Sept. 26, 1989 now abandoned.

BACKGROUND OF THE INVENTION

1. Field of the Invention

The present invention generally relates to a rubber composition, and a rubber article, such as a rubber vibration isolator and a rubber tire, formed from the rubber composition. In particular, the present invention is concerned with a rubber composition suitable for producing rubber articles which possess not only high heat-resistance, high durability, but also excellent dynamic-spring characteristic (i.e., sufficiently low dynamic spring constant).

2. Discussion of the Prior Art

Rubber articles have been used as a vibration isolator which is interposed between two members in a vibration transmission system so as to connect the two members in a vibration-isolating manner. In an automotive vehicle, for example, a large number of rubber vibration isolators are employed for improving ride comfort characteristic, driving stability, etc.

These rubber vibration isolators are required to possess specific physical and chemical properties according to locations at which the isolators are disposed. In particular, automotive vibration isolators such as an engine mount are required to exhibit a sufficiently low dynamic spring constant, upon application thereto of high-frequency vibrations, so as to achieve their specific purpose of preventing generation of booming noises in the passenger's room. In addition, the automotive vibration isolators must have a satisfactory durability so as to be able to serve for a long period. Furthermore, in recent years, the automotive vibration isolators are required to possess a high heat-resistance because there is the tendency that both the engine room and the exhaust emission system are subject to raised temperatures due to the use of a high-performance and high-power engine and the regulations on exhaust gas, respectively.

Also, rubber tires such as an automotive wheel tire are required to possess the same characteristics as indicated above concerning the rubber vibration isolators.

For producing rubber formed articles, such as a vibration isolator and a wheel tire, which have a sufficiently low dynamic spring constant, it is usually carried out to use sulfur serving as a vulcanizing agent, in an increased amount, or employ butadiene rubber (BR). Alternatively, it has conventionally been carried out to use carbon black serving as a reinforcing agent, in a reduced amount. However, the use of increased amount of sulfur tends to lower heat-resistance of the rubber products, and the use of butadiene rubber or use of reduced amount of carbon black tends to lower durability of the rubber products.

Meanwhile, for improving heat-resistance of rubber articles, it is usually performed to reduce the amount of sulfur used, to the lowest level that permits cross-linking of the rubber material (this method is called the "EV (effective vulcanization)" method), or reduce the sulfur amount to a level between the levels employed in the common, sulfur vulcanization and the EV method (this method is called the "semi-EV (semi-effective vulcanization)" method). Alternatively, a heat-resistant polymer is employed. However, in any case, the produced rubber articles exhibits an excessively high dynamic spring constant, and the use of heat-resistant polymer, in particular, tends to deteriorate durability of the rubber products.

Furthermore, for improving durability of rubber articles, it is generally carried out to use an increased amount of carbon black, or select a specific carbon black which has a higher reinforcing property. In either case, however, the produced rubber articles have an excessively high dynamic spring constant. In particular, in the case of a carbon black, such as HAF (high abrasion furnace black), whose particle size (diameter) is relatively small, the dynamic spring constant of the end products varies depending upon frequencies of the vibrations applied thereto. More specifically described, the dynamic spring constant of the rubber articles produced using such a carbon black, becomes extremely high upon application thereto of high-frequency vibrations (this effect is called the "Payne" effect).

As is apparent from the foregoing, the above-indicated conventional techniques have not been satisfactory to produce rubber articles with not only high heat-resistance, high durability, but also excellent dynamic-spring characteristic or a sufficiently low spring constant. Consequently, desired rubber vibration isolators or desired rubber wheel tires have not been provided yet.

SUMMARY OF THE INVENTION

It is therefore an object of the invention to provide a rubber composition preferable for producing a rubber formed article which is satisfactory regarding all of heat-resistance, durability and dynamic spring characteristic.

The above object may be achieved according to a first aspect of the invention, which provide a rubber composition comprising (1) a rubber material, (2) carbon black, (3) a vulcanizing agent, and (4) an amine compound represented by the following structural formula:

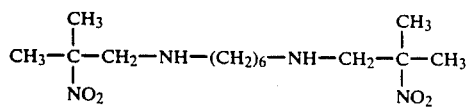

the rubber composition containing 0.5 to 4 parts by weight of the amine compound per 100 parts by weight of the rubber material.

It is another object of the present invention to provide a rubber formed article, such as a rubber vibration isolator and a rubber tire, which is satisfactory regarding all of heat-resistance, durability and dynamic spring characteristic.

The above object may be achieved according to a second aspect of the present invention, which provide a rubber formed article produced by (i) preparing a rubber composition comprising (a) a rubber material, (b) carbon black, (c) a vulcanizing agent, and (d) an amine compound represented by the following structural formula:

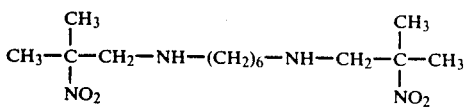

the rubber composition containing 0.5 to 4 parts by weight of the amine compound per 100 parts by weight of the rubber material, and (ii) vulcanizing the rubber composition into the rubber formed article.

The above-indicated rubber formed article according to the second aspect of the present invention, for example a rubber vibration isolator and a rubber tire, is formed from the rubber composition according to the first aspect of the invention which comprises the specific amine compound in the predetermined amount. Because of the use of the rubber composition containing the specific amine, the rubber formed article has a sufficiently low dynamic spring constant and an improved durability, while maintaining a good heat-resistance. In other words, according to the present invention, are produced rubber articles which are satisfactory regarding all of heat-resistance, durability and dynamic-spring characteristic. The present invention is preferably applied to automotive engine mounts and wheel tires.

DETAILED DESCRIPTION OF THE INVENTION

The Inventors have conducted extensive experiments over a rubber composition suitable as a material for producing a rubber formed article such as a vibration isolator which is satisfactory regarding all of heat-resistance, durability and dynamic spring characteristic, and have found that it is very effective to add a compound represented by the following structural formula (I) (hereinafter, referred to as the "amine compound"):

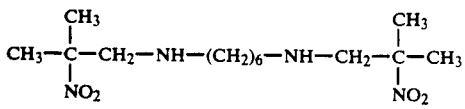

In other words, the rubber composition containing the amine compound (I), is very suitable for producing rubber articles with improved durability and dynamic spring characteristic, without lowering heat-resistance thereof. The present invention has been developed based on these findings.

Generally, a rubber composition used for producing a rubber article contains carbon black as a reinforcing agent. In the rubber composition, the carbon black is in physical, weak combination with polymer molecules of the rubber material. In the case where the amine compound is mixed and kneaded with the rubber material and carbon black, the two —$NO_2$ groups of each molecule of the amine compound are dissociated during the kneading, and consequently the amine compound has two active sites. The molecule of the amine compound reacts, at one of the two active sites thereof, with the rubber polymer molecule, and reacts, at the other active site thereof, with the carbon black. Thus, the rubber polymer molecules and the carbon black are strongly combined with each other.

The strong combination of the rubber polymer molecules with the carbon black, results in increasing durability of the rubber articles produced, and additionally minimizing the Payne effect acting between the rubber polymer molecules and the carbon black, namely, lowering the dynamic spring constant of the rubber articles produced. Furthermore, it is found that the rubber articles produced from the rubber composition containing the amine compound, do not suffer from deteriorated heat-resistance.

In the present invention, the rubber composition contains the amine compound in an amount of 0.5 to 4 parts by weight per 100 parts by weight of the rubber material. If the content of the amine compound is smaller than the lower limit of the above-indicated range of 0.5 to 4 parts by weight, the rubber article produced using such a rubber composition cannot possess desired properties because the amount of carbon black reacting with the rubber polymer becomes excessively small. If the content of the amine compound exceeds the upper limit, the unvulcanized rubber composition suffers from accordingly deteriorated scorching characteristic.

The rubber material (raw material) constituting a major component of the rubber composition according to the invention may consist of any material which is conventionally used for forming a rubber formed article such as a vibration isolator and a wheel tire. For example, the rubber material consists of natural rubber (NR), butadiene rubber (BR), isoprene rubber (IR), styrene-butadiene rubber (SBR), chloroprene rubber (CR), acrylonitrile-butadiene rubber (NBR), EPDM (ethylene-propylene-diene rubber), IIR (isobutylene-isoprene rubber), or a blend of any combination of these materials.

As described above, the rubber composition contains carbon black as a reinforcing agent. The carbon black is capable of improving various mechanical properties of the vulcanized rubber product, such as tensile strength, hardness, tearing strength, wear resistance, etc. The rubber composition contains the carbon black in an amount of 10 to 100 parts by weight per 100 parts by weight of the rubber material, according to desired hardness levels.

Furthermore, the rubber composition of the invention contains a vulcanizing agent in an amount of 0.1 to 10 parts by weight per 100 parts by weight of the rubber material, according to desired durability levels. The vulcanizing agent may be suitably selected from the group which includes sulfur, peroxides, thiourea, oximes, alkylphenolic resins, disulfides, metallic oxides, and polyamines and derivatives thereof.

In the present invention, the rubber composition may additionally contain at least one additive selected from a vulcanization accelerator, an activator, a processing aid, and an antioxidant. The rubber composition may also contain a softener, a filler, and/or a tackifier, as needed.

The vulcanization accelerator may be sulfeneamide type accelerators, thiazole type accelerators, thiuram type accelerators, and dithiocarbamates. It is recommended that the rubber composition contain 0.1 to 10 parts by weight of the accelerator per 100 parts by weight of the rubber material.

The vulcanization activator may be selected from suitable metallic oxides such as zinc oxide, and added in an amount of 3 to 15 parts by weight per 100 parts by weight of the rubber material.

As the processing aid, fatty acid such as stearic acid, or vegetable fats and oils such as fatty oil may be used in an amount of 0.5 to 5 parts by weight per 100 parts by weight of the rubber material.

The antioxidant may be added, in an amount of 0.5 to 8 parts by weight per 100 parts by weight of the rubber material. The antioxidant may be selected from the group which includes amine type antioxidants, phenol type antioxidants, imidazole type antioxidants, metal salts of carbamic acids, and waxes.

The softener, which may be added optionally as needed, may consists of a paraffinic, naphthenic or aromatic process oil, or an ester plasticizer, which is added in an amount of 0 to 40 parts by weight per 100 parts by weight of the rubber material.

The filler may be calcium carbonate, clay or talc, and may be added in an amount of 0 to 150 parts by weight per 100 parts of the rubber material.

The tackifier may be selected from the group which includes, for example, alkylformaldehyde resins, petroleum resins, and hydrogenated rosins. The tackifier may be used in an amount of 0 to 10 parts by weight per 100 parts by weight of the rubber material.

The amine compound, and the optionally added additives indicated above are mixed with the rubber material, carbon black and vulcanizing agent in a suitable known manner, to obtain the rubber composition according to the present invention, from which a rubber formed article, such as a vibration isolator and a wheel tire, according to the invention is produced. Specifically, the prepared mixture is kneaded, formed into a desired shape, and subsequently vulcanized into the end product, by known suitable processing tools.

To further clarify the concept of the present invention, several examples of the invention will be illustrated, together with comparative examples outside of the scope of the invention. It is however to be understood that the invention is by no means limited to the details of the illustrated examples.

EXAMPLES

Various rubber compositions, namely, Invention Examples 1 to 4 and Comparative Examples 5 to 11, were prepared according to TABLE I. For preparing each rubber composition, the individual constituents listed in TABLE I are mixed and kneaded with each other. Further, an appropriate amount of the amine compound of the formula (I) was added and kneaded with the thus obtained mixtures, regarding Invention Examples 1 to 4 and Comparative Examples 9 and 10. In TABLE I, contents (parts) of the individual constituents are expressed by weight.

Comparative Examples 5 to 11 were prepared according to the conventional techniques so that the rubber articles formed therefrom possess a lowered dynamic spring constant and improved heat-resistance and durability. In particular, Example 5 was so prepared as to contain a larger amount of sulfur, while Examples 6 and 11 were so prepared as to contain a blend of natural rubber (NR) with butadiene rubber (BR) or styrene-butadiene rubber (SBR), respectively. Furthermore, Example 8 was so prepared as to contain, as the carbon black, HAF (high abrasion furnace black) acting as a stronger reinforcing agent, while Examples 9 and 10 were so prepared as to contain the amine compound of the formula (I) in different amounts relative to the amount of the rubber material, each of which amounts was outside the range of the amine compound (I) specified according to the invention.

TABLE I

| | INVENTION EXAMPLES | | | | COMPARATIVE EXAMPLES | | | | | | |
|---|---|---|---|---|---|---|---|---|---|---|---|
| | 1 | 2 | 3 | 4 | 5 | 6 | 7 | 8 | 9 | 10 | 11 |
| NATURAL RUBBER (NR) | 100 | 100 | 100 | 60 | 100 | 80 | 100 | 100 | 100 | 100 | 60 |
| BUTADIENE RUBBER (BR) | — | — | — | — | — | 20 | — | — | — | — | — |
| STYRENE-BUTADIENE RUBBER (SBR) | — | — | — | 40 | — | — | — | — | — | — | 40 |
| ZINC FLOWER (ZnO) | 5 | 5 | 5 | 5 | 5 | 5 | 5 | 5 | 5 | 5 | 5 |
| STEARIC ACID | 1 | 1 | 1 | 1 | 1 | 1 | 1 | 1 | 1 | 1 | 1 |
| CARBON BLACK | | | | | | | | | | | |
| SRF *[1] | 40 | 40 | 40 | 40 | 40 | 40 | 40 | — | 40 | 40 | 40 |
| HAF | — | — | — | — | — | — | — | 30 | — | — | — |
| NAPHTHENIC PROCESS OIL | 10 | 10 | 10 | 10 | 10 | 10 | 10 | 10 | 10 | 10 | 10 |
| ANTIOXIDANT | 5 | 5 | 5 | 5 | 5 | 5 | 5 | 5 | 5 | 5 | 5 |
| VULCANIZATION ACCELERATOR | 2.3 | 2.3 | 2.3 | 2.3 | 2.3 | 2.3 | 2.3 | 2.3 | 2.3 | 2.3 | 2.3 |
| SULFUR | 1.4 | 1.4 | 1.4 | 1.4 | 2.6 | 1.4 | 1.4 | 1.4 | 1.4 | 1.4 | 1.4 |
| AMINE COMPOUND | 0.5 | 2 | 4 | 2 | — | — | — | — | 0.3 | 6 | — |

*[1] semi-reinforcing furnace black

The prepared rubber compositions, Examples 1 to 11, were used to produce vibration isolators in the form of test pieces in known forming and vulcanizing processes. The produced test pieces were subjected to various tests to measure original properties of the rubber products. The test results are shown in TABLE II.

A static/dynamic characteristics test was conducted for each example using a cylindrical test piece (50 mm diameter × 25 mm axial length) whose opposite axial ends are vulcanized to two metallic plates, respectively. In the test, a static spring constant (Ks) was measured within a compression range of 10% ±5%, and a dynamic spring constant ($Kd_{100}$) was measured with a 10% pre-compression applied axially to the test piece and with a sinusoidal vibration (frequency; 100 Hz, amplitude; ±0.05 mm) applied axially to the same.

A heat-resistance test was conducted for each example using a cylindrical test piece (28.68 diameter × 12.7 mm axial length), in which test a compression set amount (%) $CS_{20}$ and $CS_{70}$ was measured after the test piece had been held in a 25% axially compressed state between two plates in a constant-temperature bath at 100° C. for 20 or 70 hours, respectively.

A durability test was performed for each example using a cylindrical test piece (25 mm diameter × 15 mm axial length) whose opposite axial ends are vulcanized to two metallic plates, in which test reciprocating oscillations (frequency; 300 cycles/minute, amplitude; 30 mm) were applied perpendicularly to the axis of the test piece, and was counted a number of the oscillations applied till the test piece broke.

A scorching test was performed for each example using a kneaded rubber composition (unvulcanized rubber), in which test a Moony scorch time ("5 point") was measured with the unvulcanized rubber composition held at 121° C. The results of this test are shown in TABLE II, together with the results of the above-illustrated three tests.

TABLE II

| | INVENTION EXAMPLES | | | | COMPARATIVE EXAMPLES | | | | | | |
|---|---|---|---|---|---|---|---|---|---|---|---|
| | 1 | 2 | 3 | 4 | 5 | 6 | 7 | 8 | 9 | 10 | 11 |
| STATIC/DYNAMIC CHARACTERISTICS | | | | | | | | | | | |
| $K_s$ (kg/cm$^2$) | 49.0 | 48.8 | 51.2 | 44.3 | 43.8 | 40.2 | 46.6 | *39.6 | 48.8 | 50.7 | 43.0 |
| $Kd_{100}$ (kg/cm$^2$) | 70.5 | 67.1 | 71.0 | 72.9 | 71.9 | 59.7 | 56.7 | *75.4 | 72.7 | 68.9 | *75.6 |
| $Kd_{100}/K_s$ | 1.44 | 1.38 | 1.39 | 1.65 | 1.64 | 1.49 | 1.48 | *1.90 | 1.49 | 1.36 | *1.78 |
| HEAT-RESISTANCE | | | | | | | | | | | |
| $CS_{20}$ (%) | 33 | 31 | 32 | 28 | *44 | 30 | 34 | 36 | 33 | 32 | 28 |
| $CS_{70}$ (%) | 47 | 47 | 48 | 45 | *56 | 43 | 49 | 52 | 47 | 47 | 43 |
| DURABILITY NUMBER OF OSCILLATIONS ($\times$ 10,000) | 15 | 16 | 15 | 17 | 15 | *9 | *12 | 18 | *12 | 14 | 15 |
| SCORCHING TIME (minutes) | 29 | 16 | 11 | 28 | 36 | 43 | 38 | 43 | 32 | *6 | 45 |

*unsatisfactory

It is to be understood that the above-described inventive concepts and examples of the invention may be changed, modified or improved by those skilled in the art, without departing from the scope and spirit of the invention.

What is claimed is:

1. A rubber vibration isolator interposed between two members for connecting the two members in a vibration-isolating manner, the rubber vibration isolator being produced by preparing a rubber composition comprising (a) a rubber material, (b) carbon black, (c) a vulcanizing agent, and (d) an amine compound represented by the following structural formula:

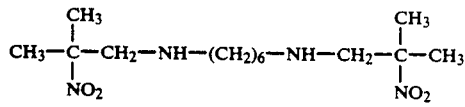

said rubber composition containing 0.5 to 4 parts by weight of said amine compound per 100 parts by weight of said rubber material; and vulcanizing said rubber composition into said rubber vibration isolator.

2. The rubber vibration isolator as set forth in claim 1, wherein said rubber material is selected from the group consisting of NR, BR, IR, SBR, CR, NBR, EPDM, IIR, and a blend of any combination thereof.

3. The rubber vibration isolator as set forth in claim 1, wherein the rubber composition contains 10 to 100 parts by weight of said carbon black per 100 parts by weight of said rubber material.

4. The rubber vibration isolator as set forth in claim 1, wherein said vulcanizing agent is selected from the group consisting of sulfur, peroxide, thiourea, oxime, alkylphenolic resin, disulfide, metallic oxide, and polyamine and its derivatives.

5. The rubber vibration isolator as set forth in claim 1, wherein the rubber composition contains 0.1 to 10 parts by weight of said vulcanizing agent per 100 parts by weight of said rubber material.

6. The rubber vibration isolator as set forth in claim 1, wherein the rubber composition further comprises at least one additive selected from the group consisting of vulcanization accelerator, vulcanization activator, processing aid, and antioxidant.

7. The rubber vibration isolator as set forth in claim 1, wherein the rubber composition further comprises at least one additive selected from the group consisting of softener, filler, and tackifier.

8. The rubber vibration isolator as set forth in claim 6, wherein said vulcanization accelerator is selected from the group consisting of sulfeneamide type accelerator, thiazole type accelerator, thiuram type accelerator, and dithiocarbamate.

9. The rubber vibration isolator as set forth in claim 6, wherein the rubber composition contains 0.1 to 10 parts by weight of said vulcanization accelerator per 100 parts by weight of said rubber material.

10. The rubber vibration isolator as set forth in claim 6, wherein said vulcanization activator is a metallic oxide.

11. The rubber vibration isolator as set forth in claim 6, wherein the rubber composition contains 3 to 15 parts by weight of said vulcanization activator per 100 parts by weight of said rubber material.

12. The rubber vibration isolator as set forth in claim 6, wherein said processing aid is selected from the group consisting of a fatty acid, vegetable fat, and oil.

13. The rubber vibration isolator as set forth in claim 6, wherein the rubber composition contains 0.5 to 5 parts by weight of said processing aid per 100 parts by weight of said rubber material.

14. The rubber vibration isolator as set forth in claim 6, wherein said antioxidant is selected from the group consisting of amine type antioxidant, phenol type antioxidant, imidazole type antioxidant, metallic salt of carbamic acid, and wax.

15. The rubber vibration isolator as set forth in claim 6, wherein the rubber composition contains 0.5 to 8 parts by weight of said antioxidant per 100 parts by weight of said rubber material.

16. The rubber vibration isolator as set forth in claim 7, wherein said softener is selected from the group consisting of paraffinic process oil, naphthenic process oil, aromatic process oil, and ester type plasticizer.

17. The rubber vibration isolator as set forth in claim 7, wherein the rubber composition contains 0 to 40 parts by weight of said softener per 100 parts by weight of said rubber material.

18. The rubber vibration isolator as set forth in claim 7, wherein said filter is selected from the group consisting of calcium carbonate, clay and talc.

19. The rubber vibration isolator as set forth in claim 7, wherein the rubber composition contains 0 to 150 parts by weight of said filter per 100 parts by weight of said rubber material.

20. The rubber vibration isolator as set forth in claim 7, wherein said tackifier is selected from the group consisting of alkylformaldehyde resin, petroleum resin, and hydrogenated resin.

21. The rubber vibration isolator as set forth in claim 7, wherein the rubber composition contains 0 to 10 parts by weight of said tackifier per 100 parts by weight of said rubber material.

22. The rubber vibration isolator as set forth in claim 10, wherein the metallic oxide is zinc oxide.

23. The rubber vibration isolator as set forth in claim 12, wherein the fatty acid is stearic acid and the oil is a fatty oil.

* * * * *